United States Patent
Marsan et al.

[11] Patent Number: 6,131,049
[45] Date of Patent: *Oct. 10, 2000

[54] ADAPTIVE DETERMINATION OF OUTBOUND CHANNEL QUALITY METRICS

[75] Inventors: Mark J. Marsan, Elmhurst; Garry C. Hess, Elgin, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/835,044

[22] Filed: Mar. 27, 1997

[51] Int. Cl.$^7$ .............................. H04B 1/38; H04B 1/16; H04M 1/00; H04Q 7/20

[52] U.S. Cl. ............... 455/574; 455/434; 455/343; 455/515; 455/38.3; 455/423; 455/436

[58] Field of Search ................... 455/436, 442, 455/437, 445, 574, 343, 38.3, 440, 434, 423, 425, 522; 370/322, 332, 333, 348

[56] References Cited

U.S. PATENT DOCUMENTS

| | | | |
|---|---|---|---|
| 5,260,943 | 11/1993 | Comroe et al. | 455/440 |
| 5,542,098 | 7/1996 | Bonta | 455/434 |
| 5,794,146 | 8/1998 | Sevcik et al. | 455/38.3 |
| 5,801,639 | 9/1998 | Dorenbosch et al. | 455/423 |
| 5,805,980 | 9/1998 | Evoy et al. | 455/38.3 |
| 5,839,069 | 11/1998 | Keshavachar et al. | 455/437 |

Primary Examiner—William G. Trost
Assistant Examiner—Raymond B. Persino
Attorney, Agent, or Firm—Christopher P. Moreno; Steven A. May; Jeffrey K. Jacobs

[57] ABSTRACT

At least one outbound channel quality metric (OCQM) is determined by a communication unit (220) based on a first number of samples per unit of time (301). When the at least one OCQM is favorable, subsequent OCQMs for that channel are determined based on a decreased number of samples per unit of time (305). When the at least one OCQM is unfavorable, subsequent OCQMs are determined based on an increased number of samples per unit of time (306). In an alternate embodiment, the number of samples per unit of time used to determine OCQMs is based on an apparent speed of the communication unit. In yet another embodiment, the number of sample per unit of time is based in part upon a difference between a serving site OCQM and a neighboring site OCQM. In this manner, current drain on a communication unit's battery is substantially reduced, thereby extending battery life.

25 Claims, 5 Drawing Sheets

ADAPTIVE DETERMINATION OF OUTBOUND CHANNEL QUALITY METRICS

FIELD OF THE INVENTION

The present invention relates generally to wireless communication systems and, in particular, to the adaptive determination of outbound channel quality metrics therein.

BACKGROUND OF THE INVENTION

Multiple-site wireless communication systems are well known in the art. In such systems, each site gives rise to its own wireless coverage area. By strategically locating the multiple sites, apparently seamless wireless coverage is provided to communication units (e.g., in-hand portable or in-car mobile radios) over an area significantly larger than the coverage area corresponding to a single site. At any time within such systems, a communication unit is affiliated with a serving site. A serving site is that site currently used to support communications with the communication unit. Any sites adjacent to the serving site (i.e., those sites which have at least some overlapping coverage area with the serving site) are considered to be neighboring sites. Throughout normal operation, the communication unit constantly determines whether the quality of service in one of the neighboring sites is sufficiently better than the quality of service in its current serving site. When this happens, a new serving site is selected, likely giving rise to an entirely new set of neighboring sites.

In determining qualities of service, each communication unit typically monitors outbound channels corresponding to its serving site and at least one of the neighboring sites. In the context of the present invention, an outbound channel refers to a wireless channel transmitted by a site and received by communication units. If a given outbound channel is being received well (strong received signal strength, relatively infrequent received errors, etc.) the quality of service is deemed good. Conversely, if the outbound channel is being received poorly (weak received signal strength, relatively frequent received errors, etc.) the quality of service is deemed bad. Often, the outbound channels monitored by the communication unit are control channels continuously transmitted by each of the sites, as known in the art.

Figure 1:
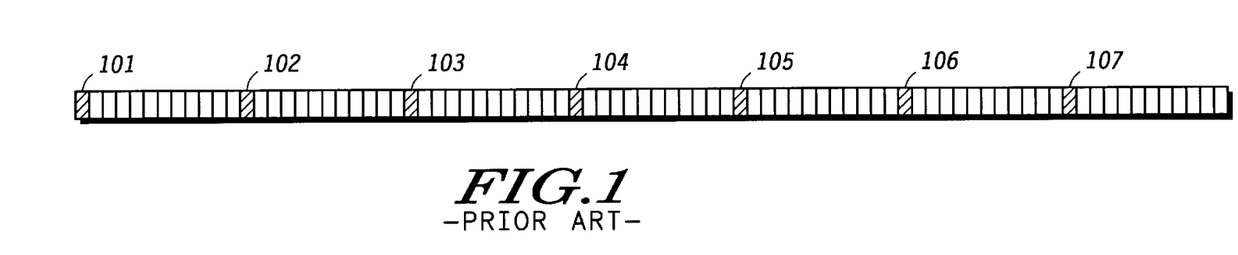
FIG. 1 illustrates sampling of an outbound TDM channel in accordance with the prior art.

An example of such monitoring is shown in FIG. 1, which illustrates a prior art method for monitoring a given outbound channel. In particular, FIG. 1 illustrates a time-division multiplexed (TDM) outbound channel in which samples 101 . 107 are periodically taken by a communication unit. Such samples are taken while the communication unit is in standby mode, i.e., not engaged in a communication. However, the sampling period (or, reciprocally, the sampling rate) is static and cannot be changed regardless of how well, or poorly, the outbound channel is being received. For example, in current "IDEN" systems, by Motorola, Inc., a communication unit must sample neighboring sites every 180 milliseconds and its serving site every 360 milliseconds.

As a result of this constant monitoring, a significant current drain is placed on the communication units. This current drain represents a substantial performance limitation on portable units where battery capabilities are limited. Using the sample periods given above, the battery charge of a typical portable unit is expended after approximately six hours. To combat this problem, it is known in the art to allow communication units to change, to a limited extent, the sampling period used when monitoring outbound channels. For example, in a system adhering to Global System for Mobile Communications (GSM) type standards, a communication unit can alter the sampling period used when monitoring outbound communication channels. (A description of the "Discontinuous Reception" mode in GSM systems can be found in the ETSI-GSM Technical Specification: GSM 03.13 version 4.01 dated Jul. 1, 1993, European Digital Cellular Telecommunications System (Phase 2).) As a unit roams, it is instructed by its various serving sites what sampling period (or rate) to use. The sampling rates sent to the communication units are based on known factors derived when the system was originally configured, e.g., the quality of coverage throughout a given site. Although this method does allow for dynamic sampling periods, the individual circumstances of a communication unit are not reflected in the sampling periods used. As a result, the maximum potential battery life for any given communication unit is not likely to be realized. Therefore, a technique that allows the circumstances of a given unit to control the sampling period used to monitor outbound channels would represent a significant advancement over the prior art.

DESCRIPTION OF A PREFERRED EMBODIMENT

The present invention overcomes the above-described limitations of the prior art and allows the sampling rate used to monitor outbound channels to be adjusted in view of a communication unit's individual circumstances. In one embodiment of the present invention, at least one outbound channel quality metric (OCQM) is determined by a communication unit based on a first number of samples per unit of time. When the at least one OCQM is favorable, subsequent OCQMs for that channel are determined based on a number of samples per unit of time not greater than the first number of samples per unit of time. Conversely, when the at least one OCQM is unfavorable, subsequent OCQMs are determined based on a number of samples per unit of time not less than the first number of samples per unit of time.

In another embodiment of the present invention, the number of samples per unit of time used to determine OCQMs is based on an apparent speed of the communication unit. At relatively low speeds, the number of samples per unit of time is decreased. Conversely, at relatively high speeds, the number of samples per unit of time is increased.

In yet another embodiment of the present invention, OCQMs (of a first type) are determined for a serving site and a neighboring site. A difference between the serving site OCQM and the neighboring site OCQM is calculated and compared to a difference threshold. When the difference is less than the difference threshold, subsequent OCQMs are determined based on a first number of samples per unit of time. When the difference is not less than the difference threshold, an additional OCQM (of a different type than the OCQMs used to calculate the difference) is compared to another threshold and, based on this comparison, the number of samples per unit of time used to determine subsequent OCQMs is adjusted. Using these methods, current drain on a communication unit's battery may be substantially reduced, thereby extending battery life.

Figure 2:
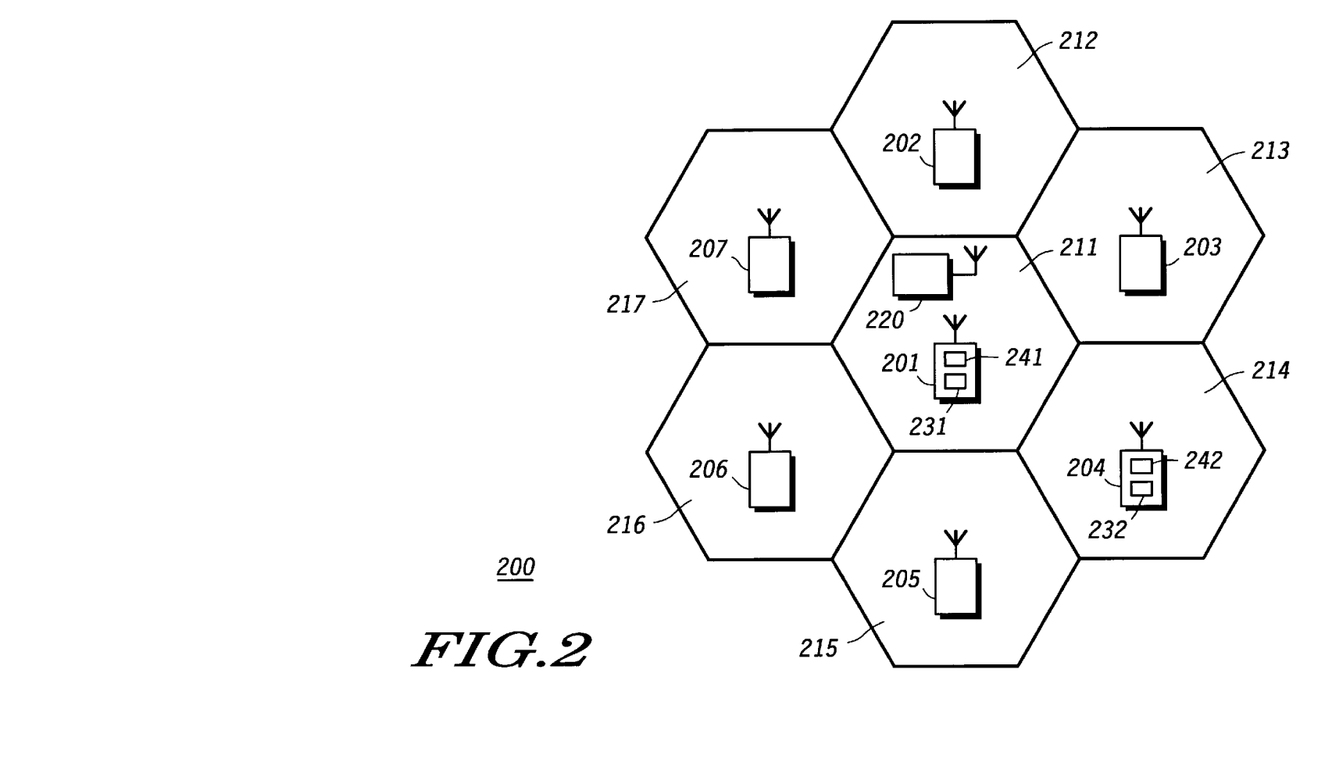
FIG. 2 is a block diagram of a wireless communication system in accordance with the present invention.

The present invention may be more fully described with reference to FIGS. 2–11. FIG. 2 is a block diagram of a wireless communication system 200 comprising a plurality of sites 201–207 and a plurality of communication units (only one shown) 220. In the preferred embodiment, the wireless communication system 200 comprises an "IDEN" system manufactured by Motorola, Inc. Each of the plurality of sites 201–207 gives rise to a corresponding coverage area 211–217. Although the respective coverage areas 211–217 are shown having well-defined borders, in practice coverage areas typically overlap and often have only loosely defined boundaries. For the purposes of illustration, it will be assumed hereinafter that the communication unit 220 is affiliated with a serving site 211. In turn, the serving site 211 is surrounded by neighboring sites 212–217. It is understood that configurations of serving and neighboring sites other than that shown in FIG. 2 are possible and within the scope of the present of the present invention.

Each of the sites 201–207 comprises at least one transceiver capable of wireless communication with the communication unit 220. In the preferred embodiment, each site implements a TDM protocol under the control of a base site controller (not shown). However, the present invention may be readily adapted for use in other types of systems such as frequency division multiplexed (FDM) or code division multiple access (CDMA) systems. Although shown for only two sites, each of the base sites 201–207 comprises a digital computing device 231–232 and memory 241–242 that are used for the storage and execution of software programs, as known in the art.

Figure 11:
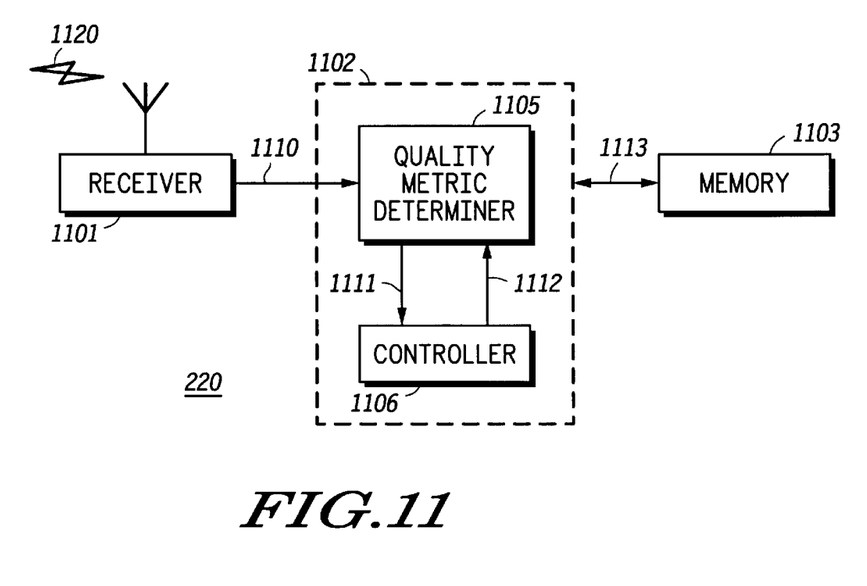
FIG. 11 is a block diagram of a communication unit in accordance with the present invention.

A preferred embodiment of the communication unit 220 is further described with reference to FIG. 11. In particular, the communication unit 220 comprises a receiver 1101, a digital computing device 1102 and memory 1103. Although not shown, the communication unit 220 also comprises a transmitter coupled to the digital computing device 1102. Executable instructions 1113 stored in the memory 1103, when executed, cause the digital computing device 1102 to comprise a quality metric determiner 1105 and a controller 1106.

When the communication unit 220 is operating in an idle mode, the receiver 1101 receives an outbound channel 1120 (i.e., a wireless carrier transmitted by one of the sites 201–207). Using known techniques, the receiver 1101 produces received outbound channel data 1110, typically in the form of uncorrected symbols or bits as known in the art. Sampling the received outbound channel data 1110 at a first rate (i.e., a first number of samples per unit of time), the quality metric determiner 1105 determines outbound channel quality metrics (OCQMs) 1111 in accordance with well known techniques. The OCQMs are indicative of the quality of the outbound channel 1120. In particular, the OCQMs may comprise received signal strength measurements, bit error rate measurements, carrier-to-interference-plus-noise ratios (C/I+N), or any other type of received signal quality measurement. Responsive to the OCQMs, the controller 1106 produces a control signal 1112 that instructs the quality metric determiner 1105 to adjust the sampling rate to be used for subsequently determined OCQMs. Methods used by the controller 1106 (or, in another embodiment described below, the sites) to determine how the sampling rates should be adjusted are described in greater detail with reference to FIGS. 3–9.

Figure 3:
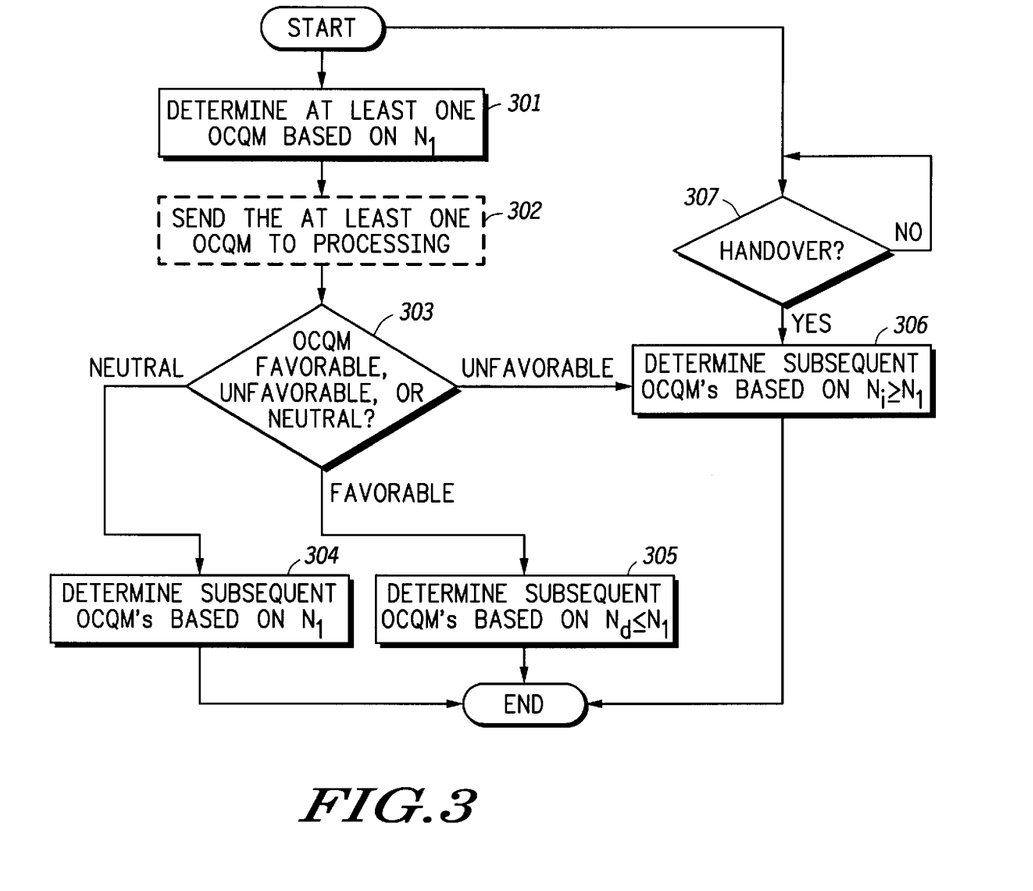
FIG. 3 is a flowchart of a method for adjusting a number of samples per unit of time based on favorability of at least one outbound channel quality metric or the occurrence of a handover.

FIG. 3 illustrates a method for adjusting sampling rates based on the favorability of OCQMs or the occurrence of a handover. That portion of FIG. 3 relating to the favorability of OCQMs is described with reference to steps 301–306. That portion of FIG. 3 relating to the occurrence of a handover is described with reference to steps 307 and 306. First describing the favorability method, a communication unit determines at least one OCQM (as described above) based on a first number of samples per unit of time ($N_1$) at step 301. This is illustrated further in FIG. 4, where a portion of an outbound channel 400 transmitted by a site (either a serving site or neighboring site) is shown as a continuous stream of time slots. (Throughout the following discussion, it is assumed that the unit of time used to compare sampling rates is one second; of course other units of time could be used without detracting from the basic principle. It is further assumed that the duration of each time slot shown in FIGS. 4–10 is 15 milliseconds for illustrative purposes only; other durations are within the scope of the present invention.) Also shown is a site monitoring period (SMP). The site monitoring period delimits a period of time during which the communication unit may acquire no more than a single sample to use in the determination of an OCQM corresponding to the outbound channel 400. Generally, a single OCQM is based on one or more samples made on the outbound channel under consideration. In the preferred embodiment, any given sample is based on measurements taken on a single time slot. In "IDEN" systems, samples are derived by decoding the slot descriptor block at the beginning of the slot. A site averaging period (SAP) is also shown, and is based on the number of SMPs being used in the determination of an OCQM. Thus, in the example shown, where a single sample is taken during each SMP and it is assumed that four samples are required when determining an OCQM, the SAP is seen to be four times the SMP. Given that the SMP is 360 milliseconds, the SAP is 1.44 seconds and $N_1$ is 2.78 samples/second (4 samples/1.44 seconds).

At step 302, the at least one OCQM determined at step 301 is optionally sent to a processing site. The processing site is preferably the serving site for the communication unit, or it can be any site within the system assuming that the sites are networked together. If the at least one OCQM is sent to a processing site, steps 303–307 are carried out wholly, or in part, by the processing site as described below. If step 302 is not performed, steps 303–306 are performed by the communication unit.

At step 303, the communication unit (or processing site) determines whether the at least one OCQM was favorable, neutral or unfavorable. It is anticipated that the at least one OCQM from step 301 may be used in computing a sliding average over the most recently determined OCQMs, which sliding average is judged at step 303, rather than just the at least one OCQM determined at step 301. Regardless, the favorable/neutral/unfavorable determination attempts to assess how well the outbound channel is currently being received relative to the current sampling rate being used. If the outbound channel is being received well (strong received signal strength, high C/I+N ratio, relatively few received bit errors, etc.), then the OCQM is considered to be favorable, indicating the possibility to reduce the sampling rate (and the corresponding current drain) without loss of performance. If the outbound channel is being received poorly (weak received signal strength, low C/I+N ratio, relatively numerous received bit errors, etc.), then the OCQM is considered to be unfavorable, indicating the necessity to increase the sampling rate in order to ensure that the best possible site is being used as the serving site. Alternatively, if the outbound channel is being received neither well nor poorly, then the OCQM is considered neutral, indicating that the current sampling rate is adequate to maintain system performance while simultaneously minimizing current drain. In the preferred embodiment, the favorable/neutral/unfavorable determination is made by comparing the at least one OCQM against upper and lower thresholds, the values of which thresholds depend in part upon the type of OCQM being judged. The upper and lower thresholds may comprise static values chosen during system design, or may comprise dynamic values that are adaptively determined based on current and local operating conditions.

If the at least one OCQM from step 301 is judged to be neutral, subsequent OCQMs (at least the next one) determined by the communication unit are based on the current (first) number of samples per unit of time, $N_1$, at step 304. If a favorable determination is made, subsequent OCQMs are based on a decreased number of samples per unit of time, $N_d$, at step 305. In the context of the present invention, the term "decreased number of samples per unit of time" is used for convenience to actually indicate a number of samples per unit of time that is less than or equal to the first number of samples per unit of time, unless otherwise noted. Equality would occur when $N_1$ already results in the lowest sampling rate allowed. Generally, however, the number of samples per unit of time is decreased, if possible, when a favorable determination has been made.

Conversely, if an unfavorable determination is made, subsequent OCQMs are based on an increased number of samples per unit of time, $N_i$, at step 306. Similarly, in the context of the present invention, the term "increased number of samples per unit of time" is used for convenience to actually indicate a number of samples per unit of time that is greater than or equal to the first number of samples per unit of time, unless otherwise noted. Equality would occur when $N_1$ already results in the highest sampling rate allowed. Generally, however, the number of samples per unit of time is increased, if possible, when an unfavorable determination has been made. When the step 302 is not performed, steps 303–306 are carried out entirely by the communication unit itself. However, when step 302 is performed, step 303 is carried out by the processing site. Thereafter, the processing site instructs the communication unit whether to continue operation based on $N_1$, or whether to switch operation based on $N_d$ or $N_i$.

In addition to the threshold determinations described above, the present invention also anticipates that values for $N_d$ and $N_i$ may also be based upon other factors, including an apparent speed of the communication unit. There are numerous method in the art for determining the apparent speed of a communication unit. Assuming all other factors being equal, values for both $N_d$ and $N_i$ can be skewed higher (i.e., more samples per unit of time) if the speed of the communication unit is relatively fast, for example, if the communication unit is currently traveling along a highway in a car. Conversely, values for both $N_d$ and $N_i$ can be skewed lower (i.e., fewer samples per unit of time) if the speed of the communication unit is relatively slow, for example, if the communication unit is currently stationary. A method based solely on the speed of a communication unit is described below with reference to FIG. 11.

Turning now to the handover portion of FIG. 3, it can be determined at step 307, whether a communication unit has undergone a handover (i.e., selected a new serving site). In such an event, subsequent CCQMs are based on $N_i \geq N_1$ at step 306. In the preferred embodiment, the $N_i$ selected after a handover corresponds to the maximum (most frequent) sampling rate allowed. This is done because, after a handover, the communication unit must quickly identify neighboring sites in the event that another handover is required.

Figures 4, 5, 6:
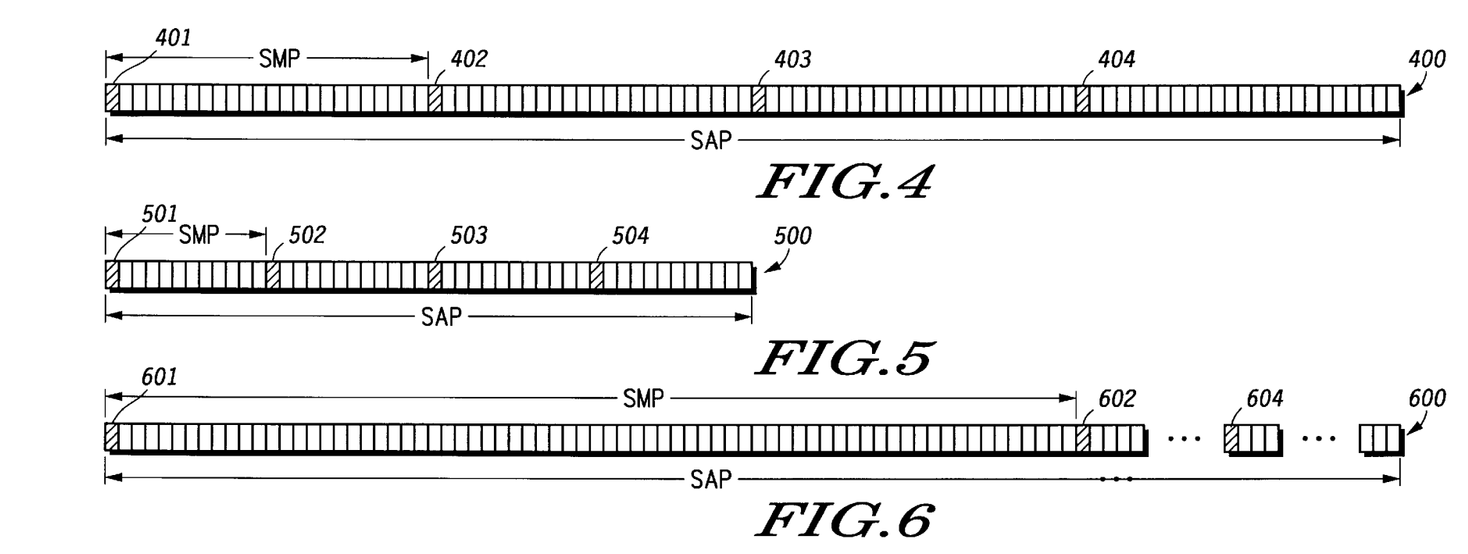
FIGS. 4–8 illustrate sampling of outbound TDM channels in accordance with the present invention.

FIGS. 5–8, like FIG. 4, illustrate portions of outbound channels transmitted by a site. In particular, FIGS. 5–8 illustrate various methods used to achieve a decreased ($N_d$) or increased ($N_i$) number of samples per unit of time relative to the first number of samples per unit of time illustrated in FIG. 4. FIG. 5 illustrates an increased number of samples per unit of time over an outbound channel 500. As in FIG. 4, the number of samples per OCQM determination is four, and a single sample is taken every SMP. However, the increased number of samples per unit of time is achieved by decreasing the SMP; in this case down to 180 milliseconds. Thus, the SAP required to get the four samples 501–504 is 0.720 seconds and $N_i$ is 5.56 samples/second. A decreased number of samples per unit of time over an outbound channel 600 is illustrated in FIG. 6. Again assuming four samples per OCQM determination, and a single sample per SMP, the decreased number of samples per unit of time is achieved by increasing the SMP; in this case up to 1.08 seconds. The SAP required to acquire all four samples 601–604 (only three shown) is 4.32 seconds and $N_d$ is 0.93 samples/second.

Figure 9:
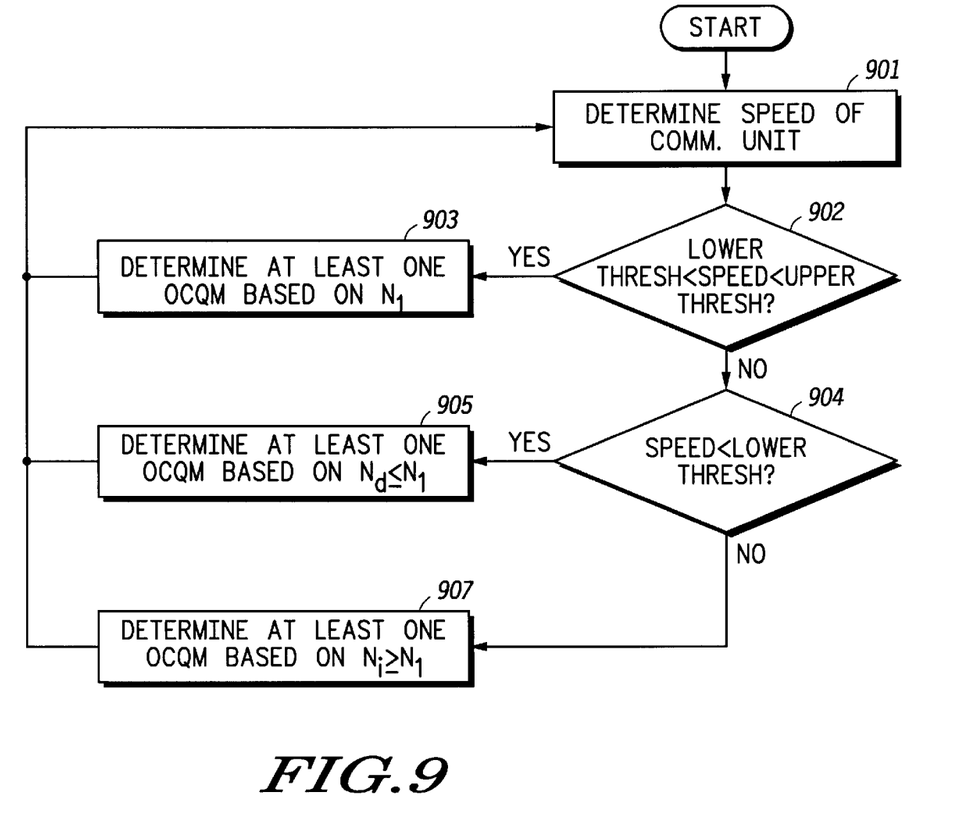
FIG. 9 is a flowchart of a method for adjusting a number of samples per unit of time based on an apparent speed of a communication unit.
Figure 10:
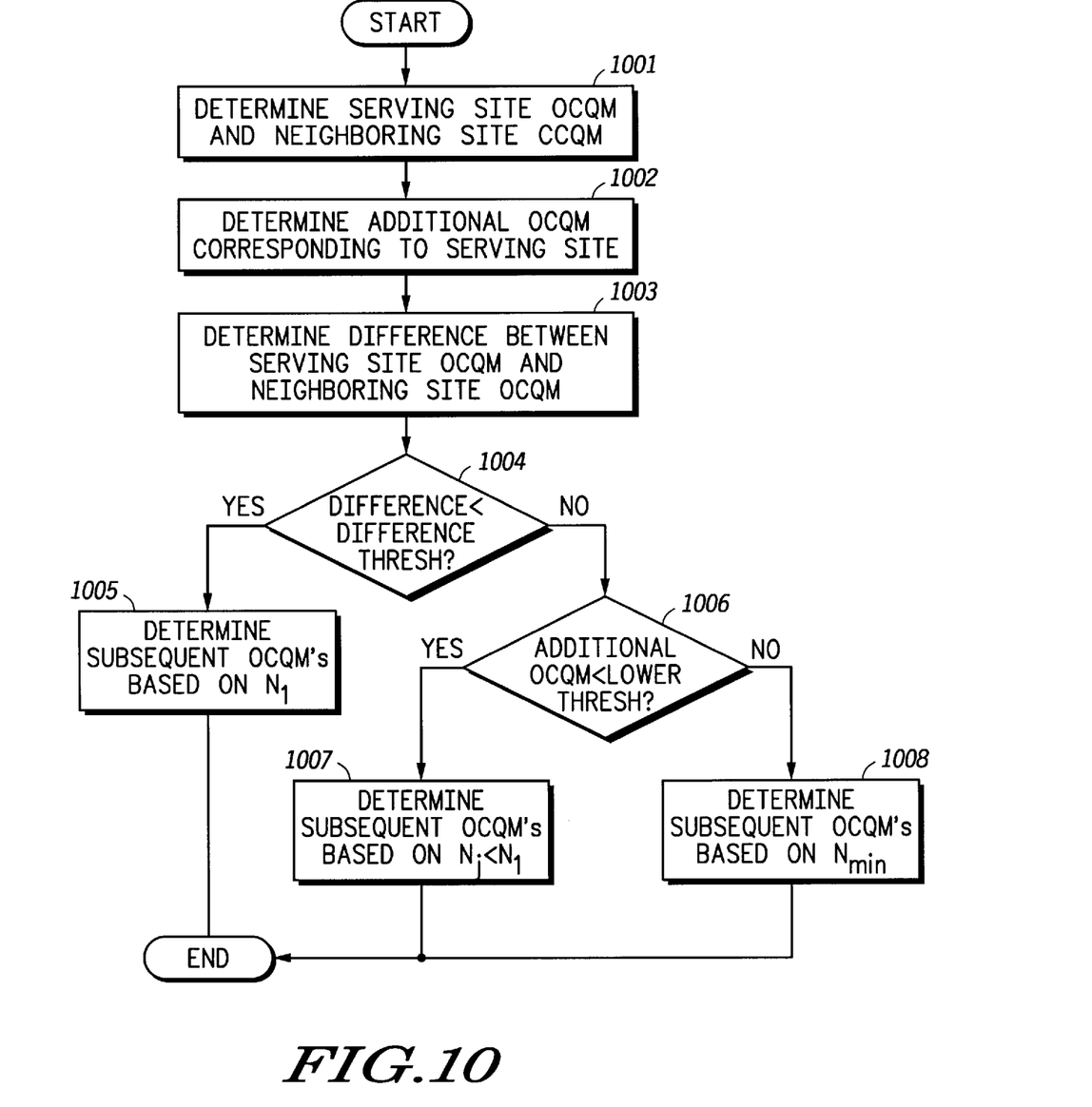
FIG. 10 is a flowchart of a method for adjusting a number of samples per unit of time based on a difference between a serving site outbound channel quality metric and a neighboring site outbound channel quality metric.

Up to this point, the present invention has been described with reference to a single outbound channel being sampled by a communication unit. However, the present invention is also beneficial where multiple outbound channels are to be monitored by a communication unit. This is illustrated in FIGS. 9–10. In FIGS. 9–10, multiple outbound channels are assumed to be essentially identically time-aligned. As a result, a single stream of time slots is shown in each figure to represent multiple outbound channels differentiated by the shading used to indicate samples taken from each outbound channel.

Figure 7:
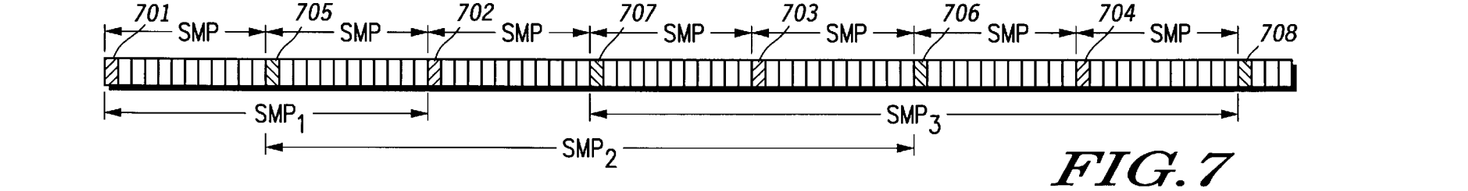

In FIG. 7, a "basic" SMP of 180 milliseconds is shown. Thus, the communication unit samples a different outbound channel every 180 milliseconds. However, different SMPs for each outbound channel can result depending on when each outbound channel is sampled. For example, it is assumed in FIG. 7 that there are three outbound channels to be monitored. For a first channel, every other sample 701–704 contributes to an OCQM for that first channel. Thus, the effective SMP for the first channel ($SMP_1$) is 360 milliseconds. The intervening samples taken between each sample for the first outbound channel are split between the remaining two channels. That is, the respective samples for the second outbound channel 705–706 and the third outbound channel 707–708 are separated by three intervening samples (two for the first channel, and one for the second or third channel). Thus, as shown, the effective SMPs for the second channel ($SMP_2$) and the third channel ($SMP_3$) are both 720 milliseconds.

Figure 8:
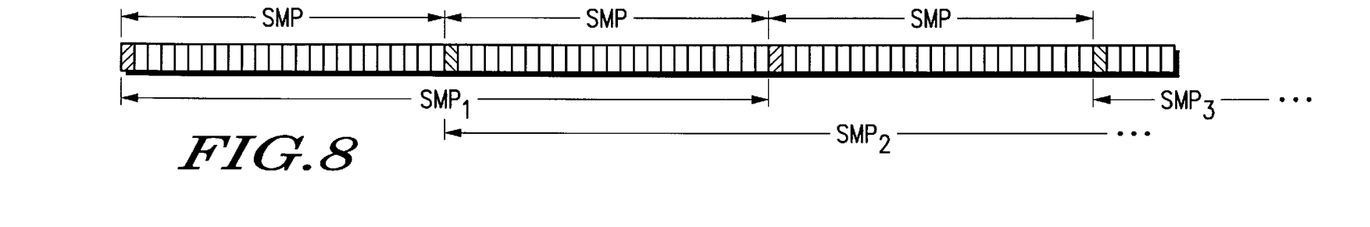

FIG. 8 illustrates usage of a decreased numbers of samples per unit of time for each of the multiple channels discussed in FIG. 7. By increasing the "basic" SMP (in this case, to 360 milliseconds), $SMP_1$ corresponding to the first channel is doubled to 720 milliseconds, and $SMP_2$ and $SMP_3$ corresponding to the second and third channels, respectively, are likewise doubled to 1.44 seconds. Of course, an increased number of samples per unit of time for each of the channels can be achieved by decreasing the "basic" SMP. Alternatively, varying the sequence in which the respective outbound channels are sampled can also result in varying effective SMPs. Although illustrated using three outbound channels, it is understood that the principles underlying FIGS. 7–8 can be equally applied to a lesser or greater number of outbound channels.

A method for adjusting the number of samples per unit of time based on the apparent speed of a communication unit is illustrated in the flowchart of FIG. 9. At step 901, the speed of the communication unit is determined. In addition to simple odometer readings, speed can be estimated from the Doppler frequency derived from Rayleigh fading characteristics which arise when a communication unit is in a typical multipath environment. Speed can be estimated from amplitude and phase characteristics of the received channel symbols over a slot. Techniques include the bandwidth of the power spectral density or the symbol level crossing rate. In addition, speed can be estimated from the bandwidth of the bandpass filter utilized in the pilot interpolation filter in the receiver of the communication unit. For the purposes of illustration, it is assumed that the communication unit currently samples outbound communication channels at a first number of samples per unit of time ($N_1$).

At step 902, the apparent speed of the unit is compared with at least one upper speed threshold and at least one lower speed threshold. The at least one upper and lower thresholds correspond to a range of apparent speeds at which $N_1$ maintains system performance while simultaneously minimizing current drain. Thus, when the apparent speed of the unit is between the thresholds, OCQMs are determined based on $N_1$ at step 903. If, at step 904, it is determined that the apparent speed of the unit is less than the at least one lower speed threshold, OCQMs are determined based on $N_d \leq N_1$ at step 905. Otherwise, the apparent speed of the unit must be higher than the at least one upper speed threshold, and OCQMs are determined based on $N_i \geq N_1$ at step 906.

Regardless, the process of measuring the apparent speed of the communication unit followed by adjustments, if necessary, to the sampling rate is continuously performed. As the number of samples per unit of time is adjusted, the corresponding upper and lower speed thresholds are also adjusted for the next iteration. For example, if, during the current iteration of the steps shown in FIG. 9, a decreased number of sample per unit of time is selected, the next iteration of steps 902 and 904 will use upper and lower speed thresholds that are correspondingly adjusted lower. Conversely, if $N_i$ is to be used for the next iteration, the upper and lower speed thresholds are correspondingly adjusted higher. Any of the previously discussed methods may be used in setting $N_d$ and $N_i$ (i.e., increasing/decreasing the SMP, etc.). The techniques of interleaved sampling of multiple outbound channels discussed relative to FIGS. 9–10 may also be beneficially employed in the method illustrated in FIG. 9. Additionally, if the apparent speed of the mobile unit is conveyed to a processing site (as described previously), steps 902 and 904 can be carried out by the processing site. In such a case, steps 903, 905 and 906 are partially a result of the processing the communication unit to adjust its sampling rate.

A method for adjusting a number of samples per unit of time based on a difference between a serving site outbound channel quality metric and a neighboring site outbound channel quality metric is illustrated in FIG. 10. An example of the logic implemented by the flowchart of FIG. 10 is shown by the following pseudocode:

If ($OCQM_{1,srv} - OCQM_{1,nbr} < X_1$)
   then $SMP_{nbr} = SMP_1$ and $M_{nbr} = M_1$
Elseif ($OCQM_{2,srv} < X_2$)
   then $SMP_{nbr} = SMP_2$ and $M_{nbr} = M_2$
Elseif ($OCQM_{2,srv} < X_3$)
   then $SMP_{nbr} = SMP_3$ and $M_{nbr} = M_3$
Elseif ($OCQM_{2,srv} < X_4$)
   then $SMP_{nbr} = SMP_4$ and $M_{nbr} = M_4$
Else $SMP_{nbr} = SMP_5$ and $M_{nbr} = M_5$.

where $OCQM_{1,srv}$ and $OCQM_{1,nbr}$ are OCQMs of a first type (in the preferred embodiment, received signal strength measured in decibels (dBs)) corresponding to a serving site and a neighboring site, respectively, of a given communication unit; $OCQM_{2,srv}$ is an OCQM of a second type (in the preferred embodiment, C/I+N measured in dBs) different from the first type corresponding to the serving site; $X_1$ is a difference threshold; $X_i$ is an i'th lower threshold; $SMP_i$ is an i'th site monitoring period; and $M_i$ is an itth number of samples per OCQM determination. Although there are three lower thresholds ($X_i$) shown in the pseudocode, any number of lower thresholds can be used as a matter of design choice. Table 1 lists the values for the above parameters shown via computer simulations to offer the best performance at both slow speeds (5 mph) and high speeds (60 mph). In Table 1, all $X_i$ are expressed in dBs, and all $T_i$ are expressed in seconds.

TABLE 1

| ΔOCQM | | $\chi_2 = 20$ | | $\chi_3 = 24$ | | $\chi_4 = 28$ | | default | |
|---|---|---|---|---|---|---|---|---|---|
| $\chi_1$ | $T_1$ | $M_1$ | $T_2$ | $M_2$ | $T_3$ | $M_3$ | $T_4$ | $M_4$ | $T_5$ | $M_5$ |
| 4 | 0.18 | 5 | 0.18 | 5 | 0.36 | 4 | 1.08 | 3 | 3.96 | 3 |

Referring to FIG. 10, a serving site OCQM and neighboring site OCQM are determined at step 1001. In the preferred embodiment, the OCQMs determined at step 1001 are received signal strengths. At step 1002, an additional OCQM corresponding to the serving site is determined. In the preferred embodiment, the additional OCQM is a C/I+N ratio. At step 1003, a difference between the serving site OCQM and the neighboring site OCQM (i.e., $OCQM_{1,srv} - OCQM_{1,nbr}$) is determined and, at step 1004, compared to the difference threshold ($X_1$). If the difference is less than the difference threshold (indicating that the outbound channel corresponding to the neighboring site is being received almost as well as the outbound channel corresponding to the serving site), then a first number of samples per unit of time ($N_1$), based on $T_1$ and $M_1$, is used to determine subsequent OCQMs for the neighboring sites at step 1005.

When the difference is not less than the difference threshold, the additional OCQM is compared against at least one of the lower thresholds ($X_j$; j≠1) at step 1006. When the additional OCQM is found to be less than the j'th lower threshold, then a j'th number of samples per unit of time ($N_j$) is used to determine subsequent OCQMs for the neighboring sites at step 1007, wherein $N_j < N_1$. Conversely, if the additional OCQM is not found to be less than any of the lower thresholds, then a minimum number of samples per unit of time ($N_{min}$) is used to determine subsequent OCQMs for the neighboring sites at step 1008. As those having ordinary skill in the art will appreciate, it is possible to incorporate the techniques described above with reference to FIGS. 5–11 into the method described in FIG. 10. Additionally, the use of a processing site, particularly with reference to steps 1003–1008, may also be beneficially employed. In this manner, an "optimal" number of samples per unit of time can be selected so as to maintain adequate performance while simultaneously minimizing current drain.

The present invention allows the sampling rate used to monitor outbound channels to be adjusted in view of a communication unit's individual circumstances. Objective criteria (i.e., measured outbound channel quality metrics, apparent speed of a communication unit) are judged against predetermined thresholds. Based on the results of such comparisons, the sampling rate is adjusted as necessary to reflect how well outbound channels are currently being received by the communication unit. In this manner, the present invention allows substantial savings in current drain to be realized. Simulations have shown that the present invention can extend batter life, on average, 120% assuming sites are monitored once per second.

Although the present invention has been described with reference to certain preferred embodiments, numerous modifications and variations can be made by those skilled in the art without departing from the novel spirit and scope of the present invention.

We claim:

1. In a wireless communication system comprising a plurality of sites and a communication unit, wherein the communication unit is serviced by a serving site of the plurality of sites, a method for the communication unit to adaptively determine outbound channel quality metrics, the method comprising steps of:

determining at least one outbound channel quality metric corresponding to the serving site, wherein the at least one outbound channel quality metric is based on a first number of samples per unit of time; and when the at least one outbound channel quality metric is favorable, determining subsequent outbound channel quality metrics based on a decreased number of samples per unit of time, wherein the decreased number of samples per unit of time is not greater than the first number of samples per unit of time, and wherein the step of determining the subsequent outbound channel quality metrics based on the decreased number of samples per unit of time further comprising a substep of using at least one of an increased site monitoring period and a decreased number of samples per site monitoring period to determine the decreased number of samples per unit of time.

2. The method of claim 1, further comprising a step of:

when the at least one outbound channel quality metric is not favorable and the first number of samples per unit of time is less than a maximum number of samples per unit of time, determining subsequent outbound channel quality metrics based on an increased number of samples per unit of time, wherein the increased number of samples per unit of time is not less than the first number of samples per unit of time.

3. The method of claim 2, the step of determining the subsequent outbound channel quality metrics based on the increased number of samples per unit of time further comprising a substep of:

using at least one of a decreased site monitoring period and an increased number of samples per site monitoring period to determine the increased number of samples per unit of time.

4. The method of claim 3, wherein the at least one of the decreased site monitoring period and the increased number of samples per site monitoring period is based at least in part upon an apparent speed of the communication unit.

5. The method of claim 1, further comprising the steps of determining the at least one outbound channel quality metric and the subsequent outbound channel quality metrics, wherein the at least one outbound channel quality metric and the subsequent outbound channel quality metrics correspond to a serving site of the plurality of sites.

6. The method of claim 1, further comprising the steps of determining the at least one outbound channel quality metric and the subsequent outbound channel quality metrics, wherein the at least one outbound channel quality metric and the subsequent outbound channel quality metrics correspond to at least one neighboring site of the plurality of sites.

7. The method of claim 1, further comprising the steps of determining the at least one outbound channel quality metric and the subsequent outbound channel quality metrics, wherein the at least one outbound channel quality metric and the subsequent outbound channel quality metrics are indicative of received signal strength.

8. The method of claim 1, further comprising the steps of determining the at least one outbound channel quality metric and the subsequent outbound channel quality metrics, wherein the at least one outbound channel quality metric and the subsequent outbound channel quality metrics are indicative of bit error rates.

9. The method of claim 1, further comprising the steps of determining the at least one outbound channel quality metric and the subsequent outbound channel quality metrics, wherein the at least one outbound channel quality metric and the subsequent outbound channel quality metrics are indicative of carrier-to-interference-plus-noise ratios.

10. The method of claim 1, wherein the at least one of the increased site monitoring period and the decreased number of samples per site monitoring period is based at least in part upon an apparent speed of the communication unit.

11. The method of claim 1, further comprising a step of:

after the communication unit has undergone a handover, determining the subsequent outbound channel quality metrics using an increased number of samples per unit of time, wherein the increased number of samples per unit of time is not less than the first number of samples per unit of time.

12. In a wireless communication system comprising a plurality of sites and a communication unit, wherein the communication unit is serviced by a serving site of the plurality of sites, a method for the communication unit to adaptively determine outbound channel quality metrics, the method comprising steps of:

determining at least one outbound channel quality metric, corresponding to the serving site, based on a first number of samples per unit of time when a speed of the communication unit is greater than at least one lower speed threshold and less than at least one upper speed threshold;

determining the at least one outbound channel quality metric based on a decreased number of samples per unit of time, wherein the decreased number of samples per unit of time is not greater than the first number of samples per unit of time when the speed is less than the at least one lower speed threshold, wherein the step of determining the at least one outbound channel quality metric based on the decreased number of samples per unit time further comprises a substep of using at least one of an increased site monitoring period and a decreased number of samples per site monitoring period to determine the decreased number of samples per unit of time; and determining the at least one outbound channel quality metric based on an increased number of samples per unit of time, wherein the increased number of samples per unit of time is not less than the first number of samples per unit of time when the speed is greater than the at least one upper speed threshold.

13. The method of claim 12, further comprising the steps of determining the at least one outbound channel quality metric, wherein the at least one outbound channel quality metric corresponds to a serving site of the plurality of sites.

14. The method of claim 12, further comprising the steps of determining the at least one outbound channel quality metric, wherein the at least one outbound channel quality metric corresponds to at least one neighboring site of the plurality of sites.

15. The method of claim 12, the step of determining the at least one outbound channel quality metric based on the increased number of samples per unit time further comprising a substep of:

using at least one of a decreased site monitoring period and an increased number of samples per site monitoring period to determine the increased number of samples per unit of time.

16. In a wireless communication system comprising a plurality of sites and a communication unit, wherein the communication unit is serviced by a serving site of the plurality of sites, a method for adaptively determining outbound channel quality metrics, the method comprising steps of:

at the communication unit:
determining at least one outbound channel quality metric corresponding to the serving site, wherein the at least one outbound channel quality metric is based on a first number of samples per unit of time;
sending the at least one outbound channel quality metric to a processing site of the plurality of sites; and at the processing site:
when the at least one outbound channel quality metric is favorable, instructing the communication unit to determine subsequent outbound channel quality metrics based on a decreased number of samples per unit of time, wherein the decreased number of samples per unit of time is not greater than the first number of samples per unit of time.

17. The method of claim 16, further comprising a step of:
at the processing site:
when the at least one outbound channel quality metric is not favorable, instructing the communication unit to determine subsequent outbound channel quality metrics based on increased number of samples per unit of time, wherein the increased number of samples per unit of time is not less than the first number of samples per unit of time.

18. The method of claim 17, the step of instructing the communication unit to determine the subsequent outbound channel quality metrics based on the increased number of samples per unit of time further comprising a substep of:

instructing the communication unit to use at least one of a decreased site monitoring period and an increased number of samples per site monitoring period to determine the increased number of samples per unit of time.

19. The method of claim 16, further comprising the steps of determining the at least one outbound channel quality metric and the subsequent outbound channel quality metrics, wherein the at least one outbound channel quality metric and the subsequent outbound channel quality metrics correspond to a serving site of the plurality of sites.

20. The method of claim 16, further comprising the steps of determining the at least one outbound channel quality metric and the subsequent outbound channel quality metrics, wherein the at least one outbound channel quality metric and the subsequent outbound channel quality metrics correspond to at least one neighboring site of the plurality of sites.

21. The method of claim 16, the step of instructing the communication unit to determine the subsequent outbound channel quality metrics based on the decreased number of samples per unit of time further comprising a substep of:

instructing the communication unit to use at least one of an increased site monitoring period and a decreased number of samples per site monitoring period to determine the decreased number of samples per unit of time.

22. In a wireless communication system comprising a plurality of sites and at least one communication unit, wherein a communication unit is serviced by a serving site of the plurality of sites, the serving site defining at least one neighboring site, a method for the communication unit to adaptively determine outbound channel quality metrics, the method comprising steps of:

determining a serving site outbound channel quality metric corresponding to the serving site;
determining a neighboring site outbound channel quality metric corresponding to a neighboring site of the at least one neighboring site;
when a difference between the serving site outbound channel quality metric and the neighboring site outbound channel quality metric is less than a difference threshold, determining subsequent outbound channel quality metrics corresponding to the serving site based on a first number of samples per unit of time;
determining an additional outbound channel quality metric corresponding to the serving site based on the first number of samples per unit of time; and
when the difference is not less than the difference threshold and the additional outbound channel quality metric is less than at least one lower threshold, determining the subsequent outbound channel quality metrics based on a number of samples per unit of time less than the first number of samples per unit of time.

23. The method of claim 22, further comprising a step of:
when the difference is not less than the difference threshold and the additional outbound channel quality metric is not less than the at least one lower threshold, determining the subsequent outbound channel quality metrics based on a minimum number of samples per unit of time.

24. A communication unit comprising:
a receiver, responsive to at least one outbound channel from a site serving the communication unit in a wireless communication system, that produces received outbound channel data corresponding to the at least one outbound channel;
a digital computing device coupled to the receiver;
a memory coupled to the digital computing device, the memory having stored thereon executable instructions that, when executed by the digital computing device, cause the digital computing device to comprise:
a quality metric determiner that produces at least one outbound channel quality metric corresponding to the at least one outbound channel based on a first number of samples per unit of time taken from the received outbound channel data; and a controller coupled to the quality metric determiner that produces a control signal to be sent to the quality metric determiner, wherein the control signal instructs the quality metric determiner to determine subsequent outbound channel quality metrics based on a decreased number of samples per unit of time when the at least one outbound channel quality metric is favorable, wherein the decreased number of samples per unit of time is not greater than the first number of samples per unit of time; and wherein the quality metric determiner uses at least one of an increased site monitoring period and a decreased number of samples per site monitoring period to determine the decreased number of samples per unit of time.

25. The communication unit of claim 24, further comprising the controller, wherein the control signal instructs the quality metric determiner to determine the subsequent outbound channel quality metrics based on an increased number of samples per unit of time when the at least one outbound channel quality metric is not favorable, wherein the increased number of samples per unit of time is not less than the first number of samples per unit of time.

* * * * *